UNITED STATES PATENT OFFICE.

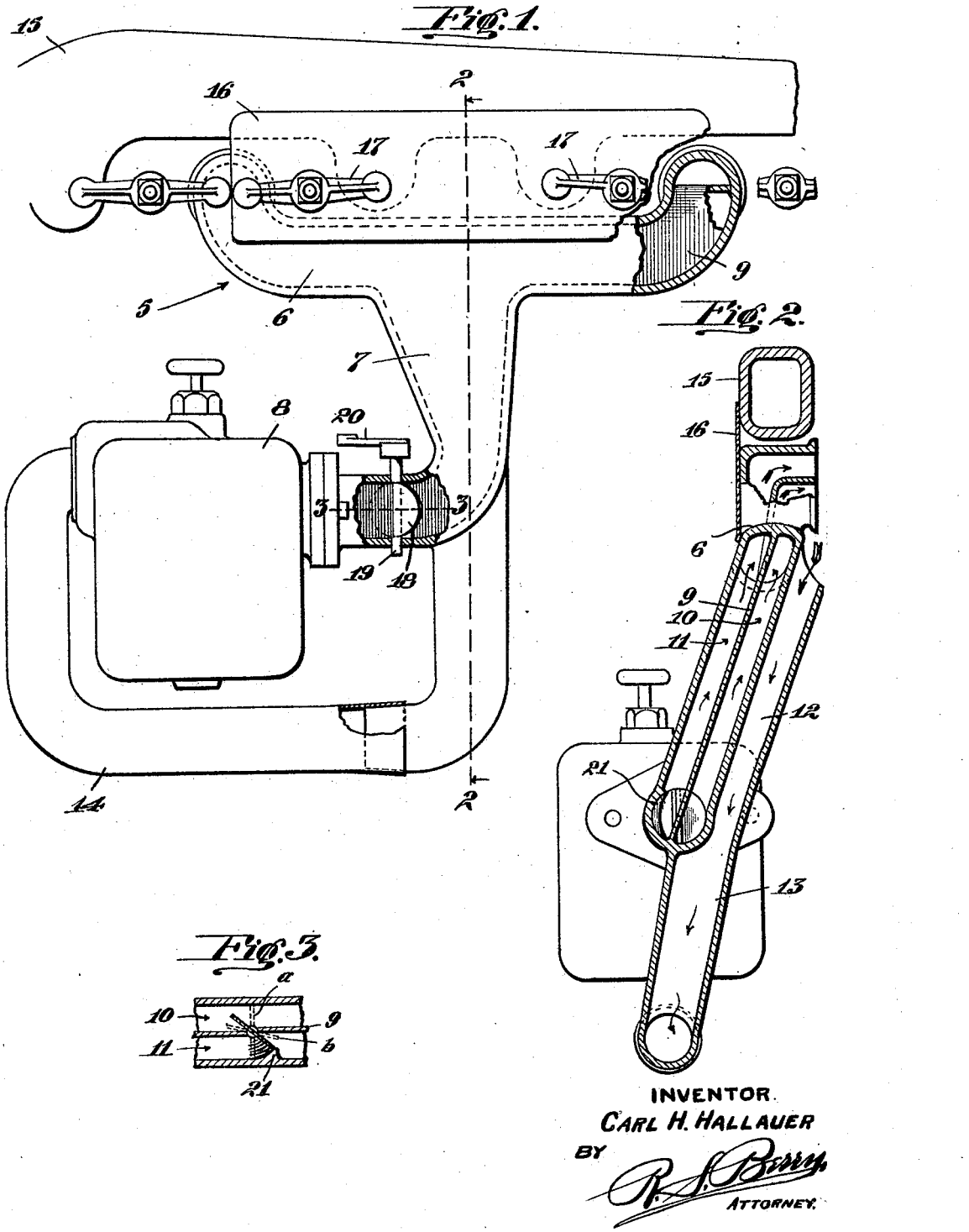

CARL H. HALLAUER, OF LOS ANGELES, CALIFORNIA.

INTAKE MANIFOLD FOR INTERNAL-COMBUSTION ENGINES.

1,420,922. Specification of Letters Patent. Patented June 27, 1922.

Application filed October 4, 1920. Serial No. 414,448.

*To all whom it may concern:*

Be it known that I, CARL H. HALLAUER, a citizen of the United States, residing at Los Angeles, in the county of Los Angeles and State of California, have invented new and useful Improvements in Intake Manifolds for Internal-Combustion Engines, of which the following is a specification.

This invention relates to the feeding of the explosive vapors to internal combustion engines, and particularly pertains to the intake tube or manifold connecting the engine to the carburetor.

An object of this invention is to provide a means whereby the velocity of flow of the vapors from the carburetor to the engine may be manually regulated according to whether the engine is running under a heavy load or is idling or running under a light load, so as to maintain a more uniform velocity relative to change of load and whereby the velocity of flow may be relatively increased when the engine is running light, so as to prevent condensation of the vapors at such times and thereby obviate choking of the engine on opening the throttle when increasing the speed of the engine.

Another object is to provide means for heating and expanding the vapors when flowing at the increased velocity so that they will enter the engine cylinder both at a high temperature and velocity when the engine is running light.

Another object is to provide a means for heating the vapors in the manifold and at the same time warm the air delivered to the intake of the carburetor to heat the vapors as they pass to the manifold.

A further object is to provide an intake manifold with a pair of separate passages and fitted with a valve for directing the flow of vapors through one or both of the passages and in which the valve will partly open one passage while maintaining the other closed.

Other objects will appear hereinafter.

The invention is illustrated in the accompanying drawings, in which:

Figure 1 is a view in front elevation of the manifold and its connection with parts broken away.

Figure 2 is a view in vertical section as seen on the line 2—2 of Figure 1.

Figure 3 is a detail horizontal section as seen on the line 3—3 of Figure 1.

More specifically, 5 indicates the intake manifold which is here shown as having a transverse portion 6, the ends of which are inturned to connect with the intake ports of the engine cylinders as is common in gas engine construction, and which manifold is formed with a downwardly extending portion 7 which is bent substantially at right angles and is adapted to be connected to the discharge opening of a carburetor 8.

In carrying out my invention, the manifold is constructed of a tubular form with a cross partition 9 arranged to divide the interior of the manifold into two passages 10 and 11 which lead from the lower end of the manifold to the ports in the engine cylinder, and formed on the underside of the manifold is a passage 12 which opens adjacent to the upper part of the transverse portion of the manifold and leads downwardly along the portion 7 into a tubular extension 13 projecting below a bent portion of the manifold, which extension is bent and is adapted to telescope with a tube 14 leading to the air intake opening of the carburetor 8. The intake manifold is mounted on the engine cylinder beneath the exhaust manifold 15 in close proximity thereto, so that air drawn into the passage 12 will pass close to the exhaust manifold so as to be warmed by heat radiating from the latter. In order to confine the air around the exhaust manifold, a plate 16 is preferably disposed across the space between the manifolds; the plate resting on the outer faces of the manifolds and held in place by the clamps 17 by which the manifolds are secured to the engine cylinder.

Mounted in the horizontally extending portion of the intake manifold is a butterfly valve 18 comprising a disk mounted on a stem 19 fitted with a handle 20 substantially corresponding to the ordinary throttle valve employed with an intake manifold. The stem 19 extends vertically through the wall 9 and the disk projects into the channels 10 and 11 and is adapted to close both of the channels when the disk is disposed transversally of the manifold, as indicated by the dotted lines *a* in Figure 3, and when the disk is turned to extend close to the partition 9, as indicated by the dotted lines $b$ in Figure 3 to open the passages 10 and 11 to the carburetor. In order that the outer passage 11 may be maintained closed while the inner passage 10 is partly open, the outer wall of the passage 11 is formed with a concave inwardly projecting flange 21, the concave face of which conforms to the curvature of the edge of the disk, so that when the latter is placed in an oblique position, as shown in full lines in Figure 3, the passage 11 will be closed and the inner passage partly open.

In the operation of the invention, when the engine is idling or running under a light load the valve is disposed substantially as shown in Figure 3 and closes passage 11 and opens passage 10, so that the vapors drawn into the engine cylinders will be delivered thereto solely through the inner passage 10 and will be given an increased velocity relative to the speed of the engine by reason of the restricted or reduced relative cross sectional area of the intake manifold. The air drawn into the carburetor from adjacent the exhaust manifold will be warmed by the latter and will act to heat the inner wall of the passage 10, so that the vapors flowing therethrough at the increased velocity will also be increased in temperature which serves to insure a more complete charging of the engine cylinder than is effected under ordinary systems. The higher velocity effected in the passage 10 serves to prevent condensation of the vapors in the intake manifold and obviates an inrush of the condensed vapors into the engine cylinders on suddenly opening the throttle and the consequent choking of the engine by delivering an unexplosive charge thereto.

When the engine is operating under a heavy load the valve is disposed to open the passages 10 and 11, so as to permit vapors to pass through both of the passages in an increased volume and at lower velocity.

From the foregoing it will be seen, that I have provided a simple and effective means whereby the velocity of flow of the vapors may be manually regulated and controlled according to varying conditions, so as to maintain a more uniform charge of the engine cylinder relative to variations of the load.

While I have shown and described a specific embodiment of my invention, I do not limit myself to the exact details of construction shown, but may resort to such changes and modifications as occasion may require coming within the scope of the appended claims.

I claim:

1. In an internal combustion engine, the combination of an exhaust manifold, a carburetor, an intake manifold leading from the carburetor to the engine cylinders arranged adjacent the exhaust manifold, a partition in the intake manifold dividing it into separate passages, an air conduit leading along the walls of the innermost passage opening at its upper end adjacent to the exhaust manifold and at its lower end to the intake of the carburetor, a plate extending between the manifolds for directing the flow of air into the air conduit, and a valve for controlling the flow of vapors through said passages.

2. In an intake manifold, a tube formed with a partition dividing it into a pair of passages, a butterfly valve arranged in said tube and pivoted vertically in said partition and adapted to be disposed across both of said passages to close same collectively, and to be positioned to extend close to the partition to open both of the passages; the wall of one of said passages having an inwardly projecting flange conforming to the butterfly valve whereby when the valve is disposed in an oblique position one of the passages will be maintained closed while the other is partly open.

CARL H. HALLAUER.